Feb. 14, 1967  E. H. HANOVER  3,304,096
WHEEL SUPPORT

Filed Nov. 16, 1964  2 Sheets-Sheet 1

Edward H. Hanover
INVENTOR.

BY Carl B. Fox, Jr.
ATTORNEY

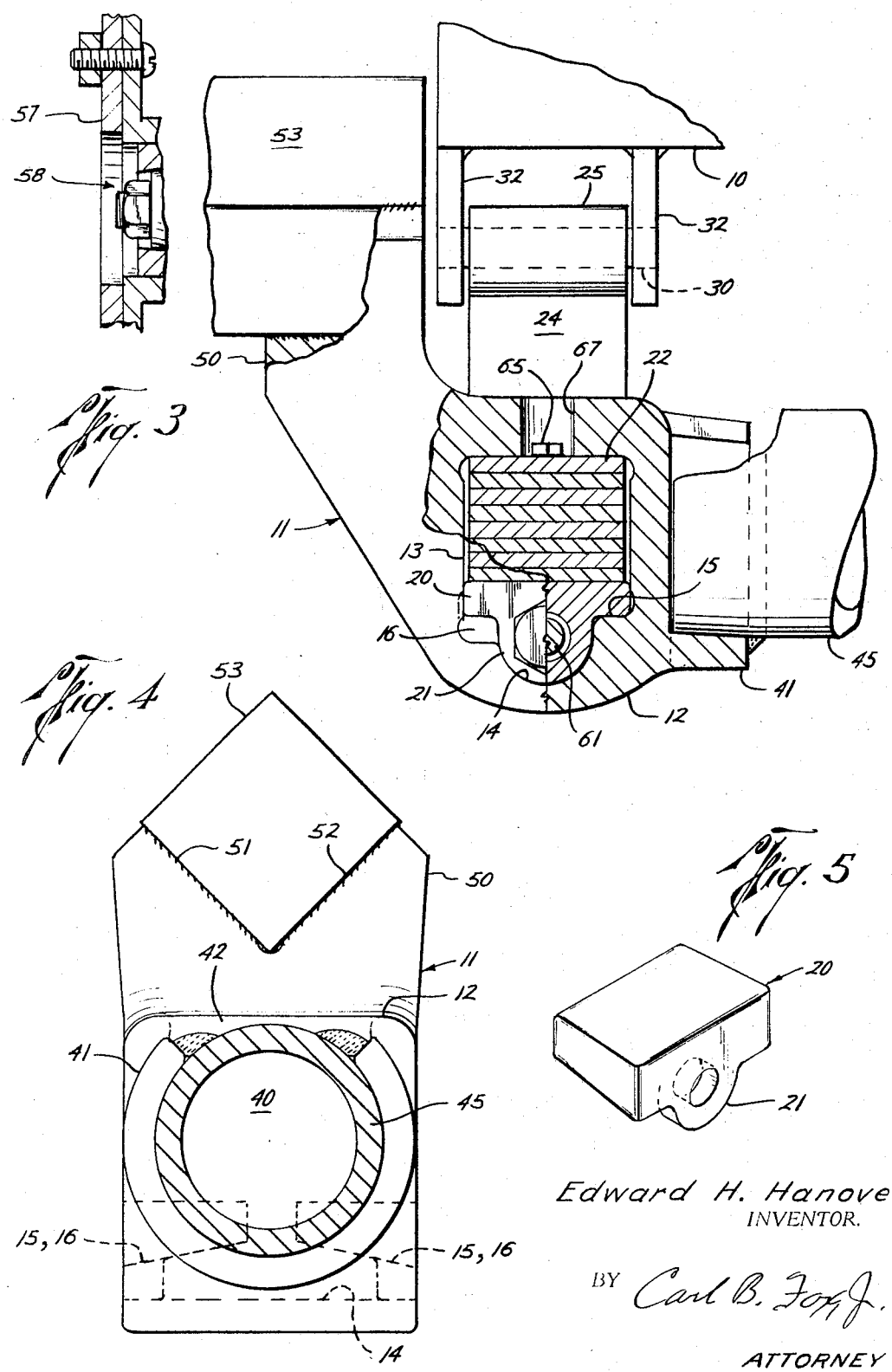

United States Patent Office 3,304,096
Patented Feb. 14, 1967

3,304,096
WHEEL SUPPORT
Edward H. Hanover, Bryan, Tex., assignor to
Ed Hanover Trailers, Inc., Bryan, Tex.
Filed Nov. 16, 1964, Ser. No. 411,344
5 Claims. (Cl. 280—104.5)

This invention pertains to apparatus for the mounting of wheels on trailers and other vehicles.

A principal object of the invention is to provide wheel mount apparatus for vehicles wherein the wheels are disposed with their axles above the lower portion of the body of the vehicle.

An additional object of the invention is to provide such apparatus wherein the springs supporting the trailer, or other vehicles, are in part supported by the wheel mount apparatus.

An additional object of the invention is to provide such wheel mount and spring supporting apparatus, the assemblies of which are simplified, and the cost, efficiency, and operation of which are improved.

Briefly, the invention provides, in conjunction with vehicles, including trailers and like vehicles, wheel support and spring mounting apparatus, combined in a single unit, which is efficient, safe, simple, and economically beneficial. The single mounting unit is provided, which supports the spindle on which the wheels are carried, and engages the springs which connect the wheel mounting to the vehicle. The points of mounting of the wheels may be above the lower portions of the trailer, or the like, and in the preferred embodiment herein disclosed the mountings are stabilized by a bar or cross piece beneath the vehicle which lends stability to the assembled apparatus.

Other objects and advantages of the invention will appear from the following detailed description of a preferred embodiment of the apparatus afforded by the invention, reference being made to the accompanying drawings, of which:

FIG. 3 is a side elevational view taken at right angles to the direction of view of FIG. 2, the view having portions shown in vertical cross-section;

FIG. 4 is a side elevational view taken in the direction of view of FIG. 2; and, FIG. 5 is a perspective view of one of the spring-holding wedges shown in FIGS. 2 and 3.

Figure 1:
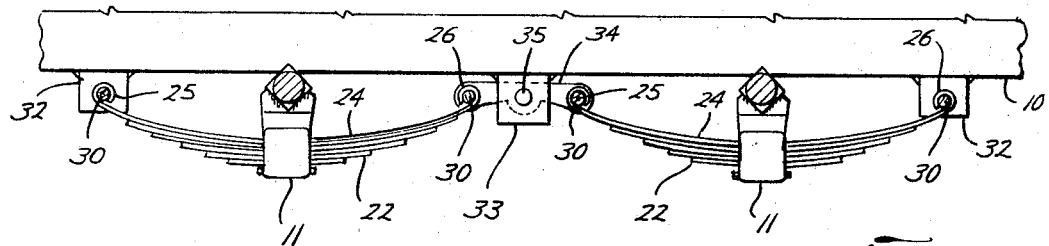
FIG. 1 is a partial side elevational view showing a tandem spring assembly at a side of a vehicle.

Referring now to the drawings in detail, in the preferred embodiment of the invention herein shown and described, which is not shown and described by way of limitation of the invention, but to exemplify the invention, the lower portion of a vehicle, e.g. a trailer, is indicated in FIGS. 1 and 3 of the drawings by reference numeral 10. A body 11 includes a portion 12 preferably disposed at least partially beneath the vehicle 10 or otherwise directed toward the space underneath the vehicle. Portion 12 of body 11 includes an opening 13 longitudinally, that is, from front to back, of the vehicle 10. Opening 13 has at its lower side a trench 14 of semicircular cross-section, or semi-cylindrcial configuration, through which a bolt is received. To the inner and outer sides of each end of trench 14 there are upwardly and outwardly facing inclined shoulder surfaces 15, 16. Wedges 20 are disposed in the opposed ends of opening 13 to clamp in place a multiple leaf spring 22. Each wedge 20 has a semi-circular outer end flange portion 21 fitting within an end of trench 14.

As is common in the construction of multiple leaf springs, the springs 22 have shorter lower spring elements and longer upper spring elements shown in FIG. 1. The uppermost spring element 24 of each spring 22 is upturned at 25, 26, the curved spring ends engaging around pins 30 mounted in brackets 32 and 33. The central brackets 33 are of pivotal type wherein the spring ends are mounted on pins 30 of a pivotal member 34 mounted on a pin 35.

Portion 12 of body 11 has at its inwardly facing end 40 an arcuately protruding flange portion 41 open at its upper side 42. It is to be understood that there is another body 11 at the opposite side of the trailer, or the like, to support the opposite wheel. Flange 41 receives therewithin, as in a socket, the end of an axle or reinforcing member 45. While member 45 is not truly an axle, it is so designated here because it runs crossways of the vehicle and occupies the location ordinarily occupied by an axle, i.e. it extends crossways of the vehicle between the wheels. The formation 41 is employed to lend strength to the connection of the axle, or reinforcement 45, each end of the axle 45 being welded to the bodies 11, one at each end of the axle, at the inner end of formation 41 as well as around the upper ends of the formation 41 and across the top of opening 42 across the top of the axle. In this way, leverage works to the benefit of the welds at formation 41 and across the top of opening 42 so that reinforcement or axle 45 is rigidly secured to body 11.

Body 11 includes an upstanding portion 50, the upper end of which has angularly inwardly facing surfaces 51, 52. It will be apparent that a square wheel shaft, or spindle, 53 may be mounted against surfaces 51, 52, and welded in place. The configuration of spindle 53 is square, so that the dimensions of the sides thereof with relation to surfaces 51, 52, is variable. If the sides of member 53 are shorter than surfaces 51, 52, then the axis of the wheel mount will be below the upper ends of surfaces 51, 52. On the other hand, if the sides of shaft 53 are longer than surfaces 51, 52, then the axis of the wheel mounting may be above the upper ends of surfaces 51, 52.

As is shown in the drawings, a wheel 57 is supported on a rotative assembly 58 carried by the spindle 53, or spindles, at each side of vehicle 10. Inasmuch as the spindles 53 are disposed vertically above element 45, it is apparent that the lower portion of the vehicle 10 may be supported relatively closer to the ground than if the axes of the wheels supporting the vehicle were disposed at a lower level.

Figure 2:
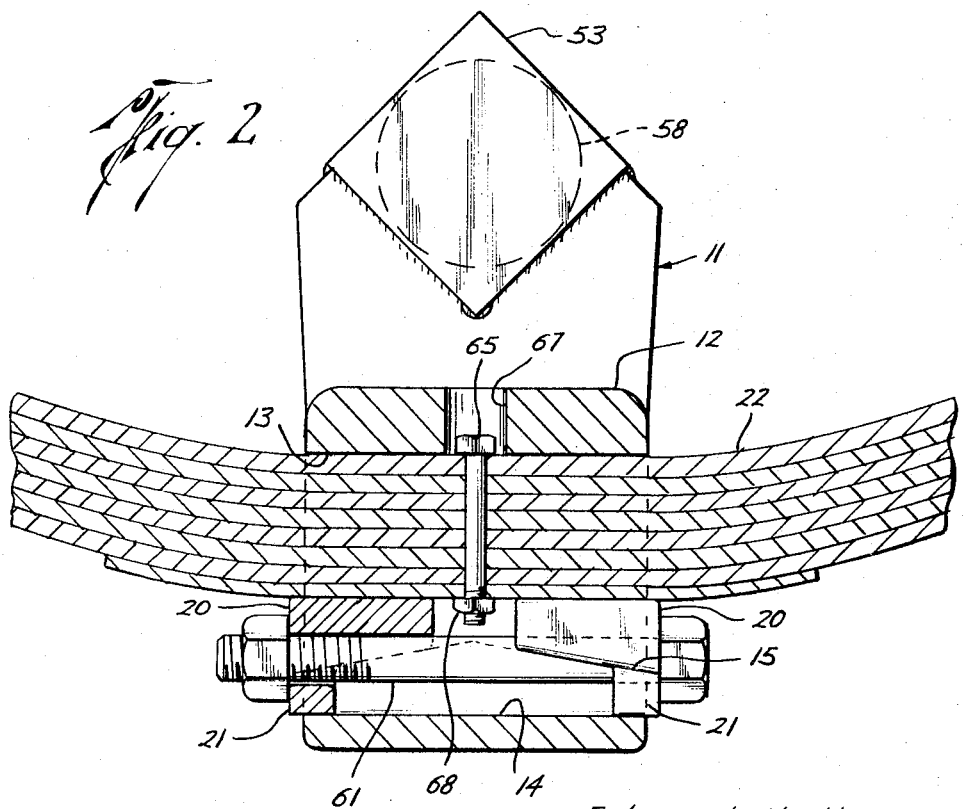
FIG. 2 is an enlarged vertical cross-sectional view taken along the longitudinal center of a multiple leaf spring of the type shown in FIG. 1, and from the opposite direction of the direction of view of FIG. 1.

Referring now especially to FIGS. 2 and 3 of the drawings, it is seen that the wedges 20, 20 of each body 11, are held in place by the cross bolts 61. The bolts 61 tend to drive the wedges toward each other, up the opposed surfaces 15, 16, to wedge against the spring 22 and to hold it firmly in place. Spring 22 has therethrough a bolt 65, which is received through central perforations of the individual leaves of the spring assembly. The head of the bolt is disposed in opening 67 above the center of opening 13. The lower nut 68 threadingly engaged with bolt 61 is disposed between the inner ends of the wedges 20.

It will be observed that the body 11 fulfills two functions necessary to the mounting of equipment of the type described. The wheels at opposite sides of the vehicle 10, have their axes at elevations above the lower part of the bed or frame of vehicle 10. The stabilizer axle or bar 45 insures that the members 11 and the springs will remain firmly in place with regard to the vehicle.

The provision of an offset wheel mounting in combination with a spring mounting device of the form described is not heretofore known in the art. The function of member 11 to offset the spindle 53 with respect to the reinforcement member 45 does not appear in this form in the prior art. In addition, the members 11 at opposite sides of the vehicle 10, provide secure support for the wheels on the springs 22. Thus, according to the invention, there is provided a spring mount and a wheel support, the wheel support being adapted to receive a wheel spindle of any size, which is useful, dependable and safe, and provides a unique contribution to the art.

It will be realized that use of the combination wheel support and spring connection structures in trailers, and the like, will fulfill many requirements especially in vehicles in which cattle, heavy and unwieldy loads, and the like, are to be transported. The invention will permit that the vehicle 10 may be disposed much closer to ground level so that upon loading and unloading of cattle, other livestock, or other cargo, it will not be necessary to provide ramp or platform equipment for introduction thereof into the vehicle.

While preferred embodiment of the invention has been shown and described, many modifications thereof will appear to one skilled in the art, and it is intended to protect by Letters Patent all forms of the invention falling within the scope of the following claims.

I claim:

1. Wheel mount and spring holding apparatus for use in supporting a wheeled vehicle, comprising body means having an opening therethrough for receiving an elongate spring disposed longitudinally of said vehicle at one side thereof, tapered wedge means receivable in said opening and wedged against said spring for holding said spring fixedly in place therein, said body means including upwardly facing receptacle means disposed above said opening and at a side of said vehicle for receiving a wheel shaft means, said spring being a multiple leaf spring, said opening having an upper portion adapted to confine the midsection of said spring received therethrough, said opening having inclined shoulder means as its lower portion adapted to direct said wedge means toward said spring, said wedge means comprising a wedge element at each end of said opening and means biasing said wedge elements each toward the other, and against the spring, said receptacle comprising an upwardly open V-shaped slot laterally across the upper end of said body means, adapted to receive a wheel shaft of any size therein.

2. Combination of claim 1, said body means having a lower portion having said spring opening therethrough adapted to extend toward and into the space underneath the vehicle carrying said spring, said body means having an upward and outward extending portion adapted to extend adjacent a side of said vehicle and having said V-shaped slot across its upper end.

3. Combination of claim 2, said lower body portion having inwardly facing socket means to receive an end of a shaft means extending cross ways of said vehicle, there being an additional spring and body means at the opposite side of said vehicle from said first-named spring and body means, and a stabilizing shaft means extending beneath said vehicle having its opposite ends received in the socket means of said two body means.

4. Combination of claim 3, there being a pair of tandem spring means and body means at each side of said vehicle, one spring at each side of said vehicle being forward and one spring at each side of said vehicle being rearward, said forward and rearward springs at each side of said vehicle being interconnected by rocker means carried by said vehicle whereby to act in concert to alleviate ground shock to said vehicle moving along the ground.

5. Combination of claim 4, said body means each comprising a partially circular socket formation facing the center of said vehicle, said stabilizing shaft means having its ends received in said socket means and welded thereto around the inner ends of said socket formation and at the azimuthal ends of said socket formation and between the azimuthal ends of said socket formation, whereby said stabilizing shaft means-body means welds are strengthened because of leverage between the inner and outer of said welds.

References Cited by the Examiner

UNITED STATES PATENTS

| 2,072,198 | 3/1937 | Davis | 267—52 X |
| 2,080,123 | 5/1937 | Francis | 267—52 |
| 2,900,197 | 8/1959 | Hutchens | 280—104.5 |

BENJAMIN HERSH, *Primary Examiner.*

P. GOODMAN, *Assistant Examiner.*